US012679787B2

(12) United States Patent
Adriaanse et al.

(10) Patent No.: US 12,679,787 B2
(45) Date of Patent: Jul. 14, 2026

(54) SOLVENT COMPOSITION FOR A UREASE INHIBITOR, APPLICATION AND USE THEREOF

(71) Applicant: Sasol Chemicals GmbH, Hamburg (DE)

(72) Inventors: Frederik Gideon Adriaanse, Potchefstroom (ZA); Arjan Paul Hendrik Gelissen, Haltern am See (DE); Bernd Lussem, Haltern am See (DE); Anja Radziej, Haltern am See (DE)

(73) Assignee: Sasol Chemie GmbH & Co. KG, Hamburg (DE)

( * ) Notice: Subject to any disclaimer, the term of this patent is extended or adjusted under 35 U.S.C. 154(b) by 837 days.

(21) Appl. No.: 17/922,903

(22) PCT Filed: Jun. 10, 2021

(86) PCT No.: PCT/EP2021/065713

§ 371 (c)(1),
(2) Date: Nov. 2, 2022

(87) PCT Pub. No.: WO2021/250209

PCT Pub. Date: Dec. 16, 2021

(65) Prior Publication Data

US 2023/0159406 A1 May 25, 2023

(30) Foreign Application Priority Data

Jun. 10, 2020 (EP) .................................... 20179374

(51) Int. Cl.
*C05G 5/23* (2020.01)
*C05C 9/00* (2006.01)
*C05G 3/90* (2020.01)

(52) U.S. Cl.
CPC .................. *C05G 5/23* (2020.02); *C05C 9/00* (2013.01); *C05G 3/90* (2020.02)

(58) Field of Classification Search
CPC .... C05G 5/23; C05G 3/90; C05G 5/20; C05C 9/00; Y02P 60/21
See application file for complete search history.

(56) References Cited

U.S. PATENT DOCUMENTS

| | | | |
|---|---|---|---|
| 2017/0001921 | A1 | 1/2017 | Gabrielson et al. |
| 2018/0002245 | A1 | 1/2018 | McKnight et al. |
| 2019/0169081 | A1 | 6/2019 | McKnight et al. |

FOREIGN PATENT DOCUMENTS

| | | | |
|---|---|---|---|
| CN | 109599508 | 4/2019 | |
| KR | 20110128604 | 11/2011 | |
| WO | 2008000196 | 1/2008 | |
| WO | WO-2012166828 A1 * | 12/2012 | .............. C09D 7/20 |
| WO | 2017144698 | 8/2017 | |
| WO | 2018152369 | 8/2018 | |

* cited by examiner

*Primary Examiner* — Amber R Orlando
*Assistant Examiner* — Heather Elise Silva Rainbow
(74) *Attorney, Agent, or Firm* — Werner IP Law, P.C.

(57) ABSTRACT

This invention relates to solvent compositions comprising an alkyl glycol ester-type solvent and a glycol-type solvent, non-aqueous solvent delivery formulations comprising the solvent composition, a urease inhibitor dissolved in the solvent composition, and fertilisers comprising a urea-based component and the non-aqueous solvent delivery formulation and the use of the fertilisers in agricultural applications.

22 Claims, No Drawings

SOLVENT COMPOSITION FOR A UREASE INHIBITOR, APPLICATION AND USE THEREOF

FIELD OF THE INVENTION

This invention relates to solvent compositions comprising an alkyl glycol ester-type solvent and a glycol-type solvent, non-aqueous solvent delivery formulations comprising the solvent composition and a urease inhibitor dissolved in the solvent composition, fertilisers comprising a urea-based component and the non-aqueous solvent delivery formulation, the use of the non-aqueous solvent delivery formulation for the treatment of fertilisers, and the use of fertilisers in agricultural applications.

BACKGROUND OF THE INVENTION

In many crop production systems, essential plant nutrients need to be supplemented by the application of fertilisers. Nitrogen, phosphorus, potassium, sulphur, calcium, and magnesium are required in the largest quantities and are for this reason called macronutrients. Nitrogen is the macronutrient taken up by plants in the largest quantity, but also the nutrient most susceptible to volatilization and leaching losses. For these reasons, nitrogen is also the nutrient added to soils in the largest quantity through nitrogen-containing fertilisers. This often represents a substantial cost per hectare of soil that is fertilised. Urea is the most widely used nitrogen source, followed by nitrate compounds such as ammonium nitrate, calcium nitrate, potassium nitrate, and magnesium nitrate. Globally, most nitrogenous fertilisers are applied as granular formulations, although a significant proportion is also provided in liquid form.

Although granular urea is the most widely used nitrogen source, much of the nitrogen from urea is lost as ammonia gas into the atmosphere when surface applied to soils for crop and plant uptake. The average nitrogen loss from surface applied urea is about 16%, but can be as high as 45% under conditions conducive to volatilization. These nitrogen losses can timely be addressed by additional fertiliser applications at considerable cost, but nitrogen losses can also manifest in crop yield losses which can potentially have even greater financial implications than fertiliser cost. Ammonia also contributes significantly to the greenhouse effect.

The hydrolysis of urea on the soil surface is the process responsible for ammonia volatilization losses. This process is facilitated by the enzyme urease, which is naturally present in organic material. By inhibiting the activity of urease, the hydrolysis process is inhibited, and ammonia losses reduced.

The hydrolysis of urea proceeds generally according to the equation:

$$(NH_2)_2CO + H_2O \xrightarrow{Urease} NH_3 + H_2NCOOH \rightarrow 2NH_{3(g)} + CO_{2(g)}$$

The inhibition of hydrolysis should, however, only be temporary to allow for leaching of urea into the soil where it is less prone to volatilization and becomes available for plant uptake. The urea form of nitrogen is not readily available for plant uptake. Therefore, the hydrolysis of urea followed by the nitrification of ammonium is essential for efficient plant uptake of nitrogen from urea.

The urease inhibitor mostly recognized in the art is N-(n-butyl) thiophosphoric triamide (nBPT or NBPT or nBTPT). nBPT was first introduced in the USA in the early 1980s. In 2008, nBPT was also approved as a urease inhibitor in the EU.

In order to reduce ammonia losses from surface applied urea, urea-based granules are usually coated with urease inhibitors like nBPT. nBPT must be dissolved in a liquid non-aqueous delivery system so that the urea granules can, for example, be spray coated. Almost all known solvent systems for nBPT contain N-methyl-2-pyrrolidone (NMP), which is known to increase the solubility of many different substances. However, NMP is classified as a Carcinogenic Mutagenic Reprotoxic (CMR) Category 2 substance. It is toxic for reproduction, may cause harm to the unborn child, and may irritate the eyes, skin and respiratory system. From May 2020 the use of NMP will be severely restricted in the European Union. Thus, the development of NMP-free liquid non-aqueous delivery systems for nBPT has become urgently necessary.

US20170001921A1 (Koch Agronomic Services LLC) describes a liquid carrier system for nBPT consisting of alkanol, alkenol, hydroxyalkyl aryl, glycol, glycol ether, glycol ester, glycerol, poly(alkylene glycol), poly(alkylene glycol) ether, poly(alkylene glycol) ester, alkanolamine, hydroxy acid, DMSO, N-methyl 2-pyrrolidinone (NMP) and mixtures thereof.

These compounds are described in detail, and extensive lists of solvents are given that could be used in combination to dissolve nBPT. However, there is no teaching that suggest which combination of solvents might result in an improved nBPT solvent system. Furthermore, NMP is used in all liquid carrier systems in the examples provided, and US20170001921A1 does not have any teaching of NMP-free solvent system.

NMP-free solvent systems often contain compounds having a glycol structure. WO 2008/000196 (AGRA Group, A.S.) for example describes solvent systems for the preparation of N-alkyl thiophosphoric triamide solutions comprising one or more glycol ethers preferably selected from the group comprising diethyleneglycol monomethylether, dipropyleneglycol monomethylether, triethyleneglycol monomethylether and diethyleneglycol monobutylether.

The most commonly used glycol-type solvent for nBPT is 1,2-propylene glycol, as described in WO 2017/144698 (Yara International ASA). 1,2-propylene glycol on its own dissolves a relatively low concentration of nBPT. The dissolution process also takes a relatively long time. A further problem using pure 1,2-propylene glycol is that the crystallization temperature is above 0° C. even at a relatively low nBPT concentrations. 1,2-propylene glycol is therefore not suitable to be used at sub-zero temperatures, which are commonly experienced in practice.

WO 2018/152369 describes a non-aqueous organo solvent delivery system (NOSDS) for nBPT which comprises one or more solvents selected from the group consisting of aprotic organo solvents and protic organo solvents. Among others, the aprotic organo solvent might be selected from one or more alkylene glycol alkyl ether acetates from the group consisting of dipropylene glycol methyl ether acetate, tripropylene glycol methyl ether acetate, and tripropylene glycol butyl ether acetate. The protic solvent might be selected, among others, from one or more alkylene glycols from the group consisting of ethylene glycol, 1,3 propylene glycol, 1,2 propylene glycol, and butylene glycol.

The aim of WO 2018/152369 is to prepare slurries having high concentrations (50-90 wt %) of urease inhibitor (nBPT) at 20-70° C. using the NOSDS.

This slurry is in addition also directly used for coatings of solid nitrification inhibitors. In this application, storage stability at low temperatures is not important, as the slurry is processed directly at higher temperatures. No NOSDS is provided in WO 2018/152369 that shows a low crystallisation temperature when used to dissolve high amounts of nBPT.

In Example 3 of WO 2018/152369, 1,2 propylene glycol is used as a stand-alone solvent for nBPT. 33.0 g nBPT were mixed with 7.0 g 1,2-propylene glycol at 45-55° C. This solution showed a poor dispersion stability at 50° C. No teaching can be found in WO 2018/152369 that a combination of alkylene glycol and alkylene glycol alkyl ether acetate might result in an improved nBPT solvent system.

The Applicant has surprisingly found that the addition of certain alkyl glycol esters to certain glycols, such as 1,2-propylene glycol, significantly increases the concentration of nBPT that can be dissolved, and at the same time significantly reduces the time needed to dissolve nBPT. Furthermore, certain mixtures of the glycols and the alkyl glycol esters showed significantly lower crystallization temperatures, even at high nBPT concentrations.

DESCRIPTION OF THE INVENTION

General Solvent Composition

According to the invention, there is provided a solvent composition, the solvent composition comprising or consisting of:

(A) an alkyl glycol ester-type solvent of the formula (I)

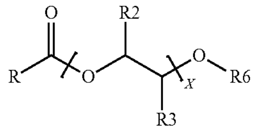

(I)

wherein

R is hydrogen or a linear or branched C1 to C5 alkyl group,

R2 is hydrogen or a methyl group,

R3 is hydrogen or a methyl group,

X is from 1 to 4,

R6 is a linear or branched C1 to C6 alkyl group, wherein R2 and R3 may be different for each X, and wherein X is the alkoxylation degree and a number average; and (B) a glycol-type solvent of the formula (II)

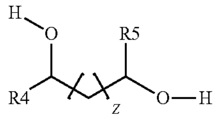

(II)

wherein R4 is hydrogen or a C1 to C3 alkyl group, R5 is hydrogen or a C1 to C3 alkyl group, and Z is an integer from 0 to 4; and wherein the glycol-type solvent and the alkyl glycol ester-type solvent are in a mass ratio the range of from 1:1 to 9:1, preferably 3:1 to 9:1, more preferably from 4:1 to 8:1, most preferably from 5.5:1 to 6.5:1.

Preferably, R is a C1 to C4 alkyl group, more preferably R is a C1 to C3 alkyl group, most preferably R is a C1 or a C2 alkyl group. R is preferably linear.

R2 and R3 may be selected such that the alkylene glycol group (AG)

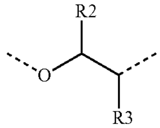

(AG)

within the alkyl glycol ester-type solvent of the formula (I) represents an ethylene oxide (EO) unit or a propylene oxide (PO) unit or both.

Thus, where AG is an EO unit, R2 is hydrogen and R3 is hydrogen, and where AG is a PO unit, either R2 is hydrogen and R3 is a methyl group, or R2 is a methyl group and R3 is hydrogen.

The AG units may be EO units only, PO units only, EO-PO or PO-EO block structure, or random EO/PO units.

Preferably AG represents an EO unit.

Preferably, R4 is hydrogen or a C1 to C2 alkyl group, more preferably hydrogen or a methyl group.

Preferably, R5 is hydrogen or a C1 to C2 alkyl group, more preferably hydrogen or a methyl group.

Preferably, X is from 1 to 3, more preferably X is from 1 to 2.2.

Preferably, R6 is a linear or branched C1 to C4 alkyl group, more preferably a linear or branched C2 to C4 alkyl group, wherein for each range the alkyl group is preferably linear, most preferably R6 is n-butyl.

Preferably, Z is an integer from 0 to 3, more preferably Z is an integer from 0 to 2, most preferably Z is 0 or 1.

Preferably, the solvent composition does not comprise N-methyl-2-pyrrolidone.

According to a preferred embodiment the solvent composition is for dissolving a urease inhibitor for fertiliser applications.

The urease inhibitor may be an N-alkyl thiophosphoric triamide, wherein the alkyl is preferably C1 to C6, preferably N-(n-butyl) thiophosphoric triamide (nBPT).

Preferred Solvent Composition

According to a preferred embodiment of the invention, the solvent composition is as hereinbefore described wherein a) R is a methyl group, b) R2 is hydrogen, c) R3 is hydrogen, d) X is from 1 to 2.2, e) R4 is a methyl group and R5 is hydrogen, or R4 is hydrogen and R5 is a methyl group, f) R6 is n-butyl, and g) Z is 0.

The alkyl glycol ester-type solvent of the formula (I) may thus be diethylene glycol mono-butyl acetate (BDG-acetate) or mono-ethylene glycol mono-butyl acetate (BMG-acetate). Most preferably, the alkyl glycol ester-type solvent of the formula (I) is diethylene glycol mono-butyl acetate (BDG-acetate).

Most preferably, the glycol-type solvent of the formula (II) is thus 1,2-propylene glycol.

In the solvent composition:

(A) the alkyl glycol ester-type solvent of the formula (I) and (B) the glycol-type solvent of the formula (II)

preferably together form greater than 70 wt % or greater than 90 wt. % or greater than 95 wt. % of the solvent composition or the solvent composition preferably exclusively consists of (A) and (B).

Non-Aqueous Solvent Delivery Formulation

According to another aspect of the invention, there is provided a non-aqueous solvent delivery formulation, the non-aqueous solvent delivery formulation comprising:

a solvent composition as hereinbefore described; and a urease inhibitor dissolved in the solvent composition wherein the concentration of the urease inhibitor in the non-aqueous solvent delivery formulation is up to 40 wt % based on the total mass of the non-aqueous solvent delivery formulation.

In a preferred embodiment of the non-aqueous solvent delivery formulation, the solvent composition is in accordance with the preferred solvent composition as hereinbefore described.

The urease inhibitor may be an N-alkyl thiophosphoric triamide, preferably N-(n-butyl) thiophosphoric triamide (nBPT). The urease inhibitor preferably consists of or comprises an N-alkyl thiophosphoric triamide, with alkyl preferably from C1 to C6, most preferably N-(n-butyl) thiophosphoric triamide (nBPT).

Preferably, the concentration of urease inhibitor in the non-aqueous solvent delivery formulation is from 10 wt % to 40 wt %, most preferably from 17.5 wt % to 30 wt %, based on the total mass of the non-aqueous solvent delivery formulation.

The solvent composition may be present in the non-aqueous solvent delivery formulation in a concentration of preferably at least 50 wt. %, more preferably at least 60 wt. %, and most preferably at least 70 wt. %, based on the total mass of the non-aqueous solvent delivery formulation.

The non-aqueous solvent delivery formulation may have a crystallization temperature below 3° C. or better below 0° C., preferably the non-aqueous solvent delivery formulation may have a crystallization temperature below −10° C., more preferably the non-aqueous solvent delivery formulation may have a crystallization temperature below −15° C.

The non-aqueous solvent delivery formulation may additionally comprise one or more nitrification inhibitors selected from the group comprising dicyandiamide (DCD), nitrapyrin, pronitridine, allylthiourea, 3,4-dimethylpyrazole phosphate (DMPP), and mixtures thereof. Preferably, the non-aqueous solvent delivery formulation comprises the nitrification inhibitor DCD.

The total concentration of the one or more nitrification inhibitors in the non-aqueous solvent delivery formulation may be up to 9 wt %, based on the total weight of the non-aqueous solvent delivery formulation.

The non-aqueous solvent delivery formulation may additionally comprise one or more dyes or colouring agents.

The non-aqueous solvent delivery formulation may additionally comprise one or more pesticide actives selected from the class of herbicides, fungicides, insecticides, and mixtures thereof.

The non-aqueous solvent delivery formulation may additionally comprise one or more additives selected from the group comprising micronutrients, biostimulants, plant growth regulators, and mixtures thereof.

According to a preferred embodiment the non-aqueous solvent delivery formulation is for fertiliser applications.

Fertiliser

According to another aspect of the invention there is provided a fertiliser, the fertiliser comprising:

a urea-based component; and the non-aqueous solvent delivery formulation as hereinbefore described.

The urea component may be at least partially, preferably completely, dissolved in the non-aqueous solvent delivery formulation.

The urea-based component may be urea, in particular a substantially pure urea, or a urea-ammonium nitrate (UAN).

The fertiliser may be a liquid or a solid fertiliser. The solid fertiliser comprises a solid urea-based component and the liquid fertiliser comprises a liquid urea-based component.

The solid urea-based component may be in a particulate form or a granular form.

The solid fertiliser may comprise the non-aqueous solvent delivery formulation in a range of from 0.5 litres to 18 litres per metric ton of the solid urea-based component, preferably in a range of from 1.5 litres to 12 litres per metric ton of the solid urea-based component, most preferably in a range of from 3 litres to 5 litres per metric ton of the solid urea-based component.

Thus, the solid fertiliser may comprise from 0.01 wt % to 0.36 wt % of the urease inhibitor based on the total mass of the solid fertiliser, preferably from 0.03 wt % to 0.24 wt % of the urease inhibitor based on the total mass of the solid fertiliser, most preferably from 0.06 wt % to 0.1 wt % of the urease inhibitor based on the total mass of the solid fertiliser.

According to one embodiment of the invention, the non-aqueous solvent delivery formulation when in contact with the solid fertiliser penetrates the particles or the granules of the solid fertiliser.

Typically, the non-aqueous solvent delivery formulation is used to treat the solid urea-based component in a particulate form or a granular form, followed potentially by further treatment steps and applied to soils for crop and/or plant uptake of nitrogen. In this manner, the solid fertiliser is first nitrogen-stabilised with the urease inhibitor, before the fertiliser is applied to soils for crop and/or plant uptake of nitrogen.

The solid fertiliser may be coated with a coating (different to the non-aqueous solvent delivery formulation), e.g. to improve physical properties and/or product handling characteristics.

The liquid fertiliser may comprise up to 17.5 wt % urea, based on the total mass of the liquid fertiliser.

The liquid fertiliser may comprise up to 15 wt % ammonium nitrate, based on the total mass of the liquid fertiliser.

The liquid fertiliser may comprise from 0.02 wt % to 0.30 wt % of the urease inhibitor based on the mass of urea in the liquid fertiliser, preferably from 0.04 wt % to 0.15 wt % of the urease inhibitor based on the mass of urea in the liquid fertiliser, most preferably from 0.06 wt % to 0.10 wt % of the urease inhibitor based on the mass of urea in the liquid fertiliser.

The urea-based component may be a liquid urea-based component. According to one embodiment of the invention the liquid urea-based component is a solid urea-based component dissolved in water.

Use of the Solvent Composition

According to another aspect of the invention, there is provided the use of the solvent composition as hereinbefore described as a solvent for a urease inhibitor.

The urease inhibitor is further defined as hereinbefore described.

Method for Treatment of the Urea-Based Component with the Non-Aqueous Solvent Delivery Formulation to Obtain a Fertiliser.

According to another aspect of the invention, there is provided a method for treatment of a fertiliser, the method comprising:

- providing a urea-based component; and
- treating the urea-based component with the non-aqueous solvent delivery formulation as hereinbefore described to produce a fertiliser.

The urea-based component may be a particulate form or a granular form.

The non-aqueous solvent delivery formulation may be applied to the solid urea-based component in a range of from 0.5 litres to 18 litres per metric ton of the solid urea-based component, preferably in a range of from 1.5 litres to 12 litres per metric ton of the solid urea-based component, most preferably in a range of from 3 litres to 5 litres per metric ton of the solid urea-based component.

According to one embodiment of the method according to the invention, the non-aqueous solvent delivery formulation when in contact with the solid urea component penetrates the particles or the granules of the solid urea component to form the fertiliser.

The solid fertilisers may optionally additionally comprise a coating different to the non-aqueous solvent delivery formulation, e.g. to improve physical properties and/or product handling characteristics. When employing the method of the invention, the solid urea-based component is preferably treated with the non-aqueous solvent delivery formulation prior to applying said different coating to produce the solid fertiliser.

The fertiliser may be as hereinbefore described.

Use of the Non-Aqueous Solvent Delivery Formulation

According to another aspect of the invention, there is provided the use of the non-aqueous solvent delivery formulation as hereinbefore described for the treatment of a urea-based component to produce the fertiliser.

The fertiliser or the solid fertiliser or the liquid fertiliser may be as hereinbefore described.

The treatment may be in accordance with the method as hereinbefore described.

Use of the Fertiliser

According to another aspect of the invention, there is provided the use of the fertiliser as hereinbefore described for the treatment of soils for crop and/or for plant uptake of nitrogen.

The invention will now be described with reference to the non-limiting examples and figures in which:

EXPERIMENTAL RESULTS

The invention will now be described with reference to the following non-limiting examples.

nBPT Solvability Tests

In WO 2017144698, crystallization temperatures for different concentrations of nBPT (called nBTPT in WO 2017144698) in pure 1,2-propylene glycol were demonstrated. Table 1 shows the effect of nBPT concentration in 1,2-propylene glycol (PG) on crystallization point (i) when the solution is first subjected to ultrasonic treatment, or (ii) when the solution is first stored at 70° C. for 2 hours.

TABLE 1

| | Crystallization temperature (° C.) | |
|---|---|---|
| | Ultrasonic treatment at 20° C. | Storage at 70° C. for 2 hours |
| 15% nBPT in PG | −4.4 | −9.7 |
| 17.5% nBPT in PG | −4.6 | −6.4 |
| 20% nBPT in PG | 2.8* | −0.1 |
| 25% nBPT in PG | 9.3* | 6.5* |
| 30% nBPT in PG | 14.3* | 9.8* |

Results marked with *are outside the claim language of WO 2017144698

In WO 2017144698, pure diethylene glycol monomethyl ether (DEGMME), pure diethylene glycol mono-butyl ether (DEGMBE) and a 1:1 mixture of DEGMBE and 1,2-propylene glycol were also tested as solvents for a 25% nBPT solution. Using these solvents, a lower crystallization temperature compared to pure 1,2-propylene glycol was demonstrated. However, both DEGMME and DEGMBE are both classified as toxic substances with H361d and H319 hazardous labelling, respectively. Therefore, the components are commercial undesirable and not useful as NMP replacements for modern urease inhibitor delivery systems.

The preferred diethylene glycol mono-butyl acetate (BDG-acetate) of the solvent formulation of the present invention does not have such hazardous labelling and therefore, in combination with 1,2-propylene glycol, provides a safe, non-hazardous solvent alternative for nBPT.

Experiments were conducted using mixtures of monoethylene glycol mono-butyl acetate (BMG-acetate) and 1,2-propylene glycol, and diethylene glycol mono-butyl acetate (BDG-acetate) and 1,2-propylene glycol at 30 wt % nBPT. No precipitation was observed. In contrast, a 1:1 mixture of DEGMBE and 1,2-propylene glycol of WO 2017144698 was unable to dissolve 30 wt % nBPT, resulting in an undesirable cloudy precipitate after some time. Both preferred solvent compositions of the present invention thus show improved nBPT solubility properties compared to the solvents disclosed in WO 2017144698.

The effect on crystalization temperature of 1,2-propylene glycol, mixtures of different ratios of 1,2-propylene glycol and BDG-acetate, and mixtures of different ratios 1,2-propylene glycol and BMG-acetate, in which nBPT was dissolved, was determined. Measurements were carried out according to ASTM D97 using an NTE 450 Instrument. The lowest temperature that could be measured with this instrument was −36° C. Results are shown in Table 2.

Crystallization temperatures strongly depend on the cooling rate of the measurements. In WO 2017144698, no cooling rate or standardized method was given (Table 1), hence crystallization temperatures could not be determined according to a comparable method.

In WO 2017144698, a most preferred embodiment was 17.5% nBPT in 1,2-propylene glycol. This was used as a reference in the present invention, although 30% nBPT in 1,2-propylene glycol was also tested (Table 2). The crystallization temperature of 17.5% nBPT in pure 1,2-propylene glycol determined according to this method was significantly lower (−31° C.) (Table 2) than the temperature specified in WO 2017144698 (−4.6° C./−6.4° C.) (Table 1). This could be ascribed to a slower cooling rate used in WO 2017144698.

TABLE 2

| | Measurement 1 | Measurement 2 | Measurement 3 |
|---|---|---|---|
| Pure 1,2-propylene glycol | | | |
| 30% nBPT | 11° C. | 12° C. | 12° C. |
| 17.5% nBPT | −31° C. | −31° C. | −31° C. |
| 1,2-propylene glycol (PG) mixture with BDG-acetate | | | |
| 30% nBPT PG:BDG-acetate = 1:1 | −4° C. | −4° C. | −4° C. |
| 30% nBPT PG:BDG-acetate = 3:1 | −4° C. | −3° C. | −4° C. |
| 30% nBPT PG:BDG-acetate = 6:1 | −11° C. | −12° C. | −12° C. |
| 30% nBPT PG:BDG-acetate = 9:1 | −10° C. | −10° C. | −10° C. |
| 17.5% nBPT PG:BDG-acetate = 6:1 | <−36° C. | <−36° C. | <−36° C. |
| 1,2-propylene glycol (PG) mixture with BMG-acetate | | | |
| 30% nBPT PG:BMG-acetate = 1:1 | 1° C. | 2° C. | 2° C. |
| 30% nBPT PG:BMG-acetate = 3:1 | −6° C. | −4° C. | −5° C. |
| 30% nBPT PG:BMG-acetate = 6:1 | −3° C. | −3° C. | −3° C. |
| 30% nBPT PG:BMG-acetate = 9:1 | −8° C. | −9° C. | −9° C. |

The addition of BDG-acetate and BMG-acetate according to the present invention both increased the solvability of nBPT and also significantly reduced the crystallization temperature. The optimal solvability of nBPT was shown at a 1,2-propylene glycol:BDG-acetate ratio of 6:1. Similarly the crystallization temperature at 30% nBPT was also the lowest for this 6:1 ratio (Table 2). The lowest crystallization temperature at 30% nBPT was observed at a ratio of 9:1 (Table 2).

Considering 6:1 and 9:1 ratios of 1,2-propylene glycol: BDG-acetate and of 1,2-propylene glycol:BMG-acetate at 30% nBPT, 1,2-propylene glycol:BDG-acetate should be more preferred due to lower crystallization temperatures at the same ratio (Table 2).

For all 1,2-propylene glycol:BDG-acetate ratios at 30% nBPT the crystallization temperature was below 0° C., but when only pure 1,2-propylene glycol at 30% nBPT was used the crystallization temperature was between 11 and 12° C. (Table 2).

At a much lower nBPT concentration of 17.5% (the most preferred range in the WO 2017144698), the crystallization temperature was −31° C. when only pure 1,2-propylene glycol was used compared to less than −36° C. when a 6:1 ratio of 1,2-propylene glycol:BDG-acetate was used (Table 2).

Combinations of 1,2-propylene glycol and BDG-acetate of the invention, compared to 1,2-propylene glycol alone, therefore clearly lowered the crystallization point considerably at both high and low nBPT concentrations, which is especially beneficial at sub-zero environmental temperatures, commonly encountered in practice.

Physical Tests

A solvent comprising 1,2-propylene glycol:BDG-acetate in a ratio of 6:1 was used to dissolve 20% nBPT to form a non-aqueous solvent delivery formulation. Commercially available granular urea was coated with the non-aqueous solvent delivery formulation and the physical characteristics tested.

Untreated commercially available granular urea, commercially available nBPT pre-coated urea granules available under the trade names AMIPLUS (a granular urea precoated with a liquid urease inhibitor formulation available under the trade name AMIPLUS Liquid from Yara) and KYNOPLUS (a granular urea precoated with a liquid urease inhibitor formulation under the trade name AGROTAIN ULTRA from Koch Agronomical Services), as well as commercially available granular urea coated with non-nBPT containing urease inhibitors available under the trade names THIOCOTE S and AZANON U from Kimleigh Chemicals were also tested for comparative purposes.

The tests carried out are summarised in Table 3.

TABLE 3

| Treatment | Urea Granules | Urease inhibitor |
|---|---|---|
| T1 | Commercially available granular urea | Urea only (not coated) |
| T2 | Commercially available granular urea of T1 coated with 0.3% inventive composition | 1,2-propylene glycol:BDG-acetate ratio 6:1; 20% nBPT |
| T3 | Commercially available granular urea of T1 coated with 0.5% inventive composition | 1,2-propylene glycol:BDG-acetate ratio 6:1; 20% nBPT |
| T4 | AMIPLUS commercially available granular urea precoated with AMIPLUS Liquid (no NMP) | Propylene glycol; Dye system (Red Brilliant); <17.5% nBPT |
| T5 | KYNOPLUS commercially available granular urea precoated with AGROTAIN ULTRA (contains NMP) | Propylene glycol; N-methyl-2-pyrrolidone (NMP); Dye system; 26.7% nBPT |
| T6 | Commercially available granular urea of T1 coated with 0.44% AZANON U (no nBPT, no NMP) | Commercial non-nBPT urease inhibitor used for coating of commercially available urea |
| T7 | Commercially available granular urea of T1 coated 1.8% THIOCOTE S (no nBPT, no NMP) | Commercial non-nBPT urease inhibitor used for coating of commercially available urea |

Hardness of the Coated Urea Granules

Hardness testing involved determining the integrity of urea granules by evaluating the breaking strength using a force gauge. The sample particle size distribution (PSD) was normalized to between 3.15 mm and 4.00 mm using a sieved shaker for consistent representative results. A Mecmecin compact digital force gauge rated to 50 kg (500 N) was used to determine the breaking strength of urea granules. Breaking strength values are indicative of the binding forces between particles within each granule. The higher the breaking strength value, the stronger the binding forces within each granule. Higher breaking strength values are more desirable, since higher braking strength ensures granule integrity, which mitigates powdering when granules are applied with farming machinery. The average breaking strength of 20 selected individual granules is reported in Table 4.

The granular hardness increased when uncoated urea (T1) was treated with the inventive composition at both 0.3% (T2) and 0.5% (T3) concentrations. The hardness of the granules after treatment with the inventive compositions (T2, T3) was also better compared to the hardness of any other treatment.

Total Water Content

Total water content was determined by using a Karl Fischer instrument. The minimum sample size was 0.5 g. Results are reported in Table 4.

The total water content increased slightly when uncoated urea (T1) was treated with the inventive composition (T2, T3). Other for than untreated urea granules (T1), the total water content was lower after treatment with the inventive composition (T2, T3), compared to all other treatments which were absent NMP (T4, T6, T7). Although treatment T5 showed the lowest total water content, it should be noted that this treatment was the only one which contained NMP as a solvent, which is not desirable. The inventive composition appeared to have no impact on the physical appearance of the urea granules.

TABLE 4

| Treatment | Breaking Strength (kg) | Total Water Content (%) |
|---|---|---|
| T1 | 2.99 | 0.08 |
| T2 | 3.47 | 0.13 |
| T3 | 3.27 | 0.12 |
| T4 | 2.81 | 0.24 |
| T5* | 2.90 | 0.10 |
| T6 | 2.72 | 0.14 |
| T7 | 2.67 | 0.20 |

[*contains NMP]

Caking and Agglomeration

Granular urea samples were subjected to a caking test under different pressure regimes, within a controlled climatic environment. Between 140 g and 150 g of each granular urea sample (T1 to T7) was loaded into a metallic cylindrical caking press and assembled inside a humidity chamber which was pre-set at a relative humidity of 65% and a temperature of 30° C. Each sample as subjected to three repeats of a caking test at a pressure of 4 bar(g) for 72 hours. Upon completion of each caking test, the urea granules or agglomerates were carefully removed from the caking rigs for crushing strength analysis. Crushing strength of the urea granules or agglomerates was determined using a digital Mecmecin Compact Force Gauge, rated to 50 kg (500 N). Low crushing strength values are indicative of weak binding forces between individual granules after they have been artificially forced together or agglomerated. Low crushing strength values are more desirable, since this results in the easy disintegration or breaking apart of granule agglomerates, and thus enables the free flowing of granules when administered using farming machinery. The average of results of all three repeats are shown in Table 5.

TABLE 5

| Treatment | Crushing strength (kg) 72 h at 4 bar | Physical Appearance of Solids |
|---|---|---|
| T1 | 3.33 | Agglomerate |
| T2 | 0.41 | Very weak/no agglomerate |
| T3 | 0.77 | Very weak/no agglomerate |
| T4 | 0.33 | Very weak/no agglomerate |
| T5* | 0.23 | Very weak/no agglomerate |
| T6 | 2.49 | Strong agglomerate |
| T7 | 2.47 | Strong agglomerate |

[*contains NMP]

Urea granules treated with the inventive composition (T2, T3) showed no agglomeration with reduced crushing strength compared to untreated urea, which is desired. Urea granules treated with the inventive composition (T2, T3) showed comparable agglomeration (i.e. comparable crushing strength) compared to T4 and T5. Urea granules of T6 and T7 (non-nBPT urease inhibitors) showed strong agglomeration (i.e. high crushing strength), which is undesirable.

Moisture Absorption

A mass of between 120 g and 150 g of each sample of urea granules (T1-T7) was placed in an open container in a sealed humidity chamber to absorb moisture. Moisture absorption was gravimetrically determined at atmospheric pressure and at a temperature of 30° C. at 55% relative humidity. Moisture absorption of the urea granules was determined every hour for six hours. After the determinations at 55% relative humidity, the humidity chamber was set at 77% relative humidity and moisture absorption was again determined every hour from the sixth until the twelfth hour. Results are shown in Table 6.

TABLE 6

| Time (h) | Relative Humidity (%) | Moisture Absorption (%) T1 | T2 | T3 | T4 | T5* | T6 | T7 |
|---|---|---|---|---|---|---|---|---|
| 1 | 55 | 0.02 | 0.00 | 0.03 | 0.12 | 0.04 | 0.01 | 0.00 |
| 2 | 55 | 0.04 | 0.02 | 0.05 | 0.17 | 0.06 | 0.02 | 0.02 |
| 3 | 55 | 0.04 | 0.01 | 0.04 | 0.19 | 0.06 | 0.03 | 0.01 |
| 4 | 55 | 0.05 | 0.06 | 0.05 | 0.21 | 0.08 | 0.04 | 0.02 |
| 5 | 55 | 0.05 | 0.00 | 0.02 | 0.18 | 0.07 | 0.02 | 0.00 |
| 6 | 55 | 0.06 | 0.01 | 0.03 | 0.20 | 0.08 | 0.06 | 0.01 |
| 7 | 77 | 2.37 | 2.49 | 2.02 | 1.97 | 1.63 | 2.19 | 1.80 |
| 8 | 77 | 4.14 | 4.08 | 3.13 | 3.49 | 3.12 | 4.34 | 2.97 |
| 9 | 77 | 5.81 | 5.39 | 4.45 | 4.39 | 3.89 | 5.43 | 3.93 |
| 10 | 77 | 5.97 | 5.63 | 4.80 | 4.79 | 4.04 | 5.39 | 4.14 |
| 11 | 77 | 7.23 | 6.97 | 5.95 | 5.78 | 4.82 | 6.36 | 5.10 |
| 12 | 77 | 9.44 | 9.00 | 7.59 | 7.29 | 6.12 | 7.80 | 6.60 |

[* contains NMP]

Moisture absorption at 55% relative humidity was insignificant over the first six hours, and all treatments showed comparable results. This is to be expected, since the critical relative humidity of urea is 72.5%. Advantageously, treatment with the inventive compositions (T2, T3) had no significant effect on water absorption of the treated granules below the critical relative humidity of urea.

At 77% relative humidity (i.e. marginally above the critical relative humidity of urea of 72.5%) moisture absorption for all tests steadily increased over the six hours.

Urea granules treated with the inventive composition (T2, T3) showed reduced moisture absorption compared to uncoated urea (T1). Urea granules coated with 0.5% of the inventive composition (T3) showed lower moisture absorption than urea granules coated with 0.3% of the inventive composition (T2). Urea granules of T3 (inventive composition) showed moisture absorption comparable with T4 and T6, indicating that the inventive composition does not have a deleterious effect in respect of moisture absorption.

Advantages of the Invention

The inventive non-aqueous solvent delivery composition showed advantages in certain respects (e.g. non-toxic, low crystallization temperature, hardness of granules) and was at least comparable in other respects (agglomeration tendency and moisture absorption) to known urease inhibitor formulations. The solvent composition of the invention is thus a superior alterative solvent to NMP and other non-NMP solvents for the urease inhibitor nBPT.

The invention claimed is:

1. A solvent composition, the solvent composition comprising:

(A) an alkyl glycol ester-type solvent of the formula (I)

(I)

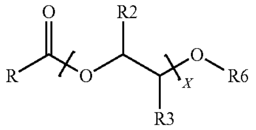

wherein

R is hydrogen or a linear or branched C1 to C5 alkyl group,

R2 is hydrogen or a methyl group,

R3 is hydrogen or a methyl group,

X is from 1 to 4,

R6 is a linear or branched C1 to C6 alkyl group, wherein R2 and R3 may be different for each X, and wherein X is the alkoxylation degree and a number average; and (B) a glycol-type solvent of the formula (II)

(II)

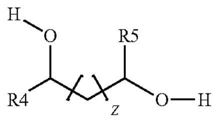

wherein

R4 is hydrogen or a C1 to C3 alkyl group,

R5 is hydrogen or a C1 to C3 alkyl group, and

Z is an integer from 0 to 4;

and wherein the glycol-type solvent of the formula (II) and the alkyl glycol ester-type solvent of the formula (I) are in a mass ratio in the range of from 3:1 to 9:1.

2. The solvent composition of claim 1, wherein (A) the alkyl glycol ester-type solvent of the formula (I) and (B) the glycol-type solvent of the formula (II) together form greater than 70 wt % of the solvent composition.

3. The solvent composition of claim 1, wherein independent from each other a) R is a C1 to C4 alkyl group; and b) R6 is a linear or branched C1 to C4 alkyl group.

4. The solvent composition of claim 1, wherein R2 and R3 are selected such that the alkylene glycol group (AG)

(AG)

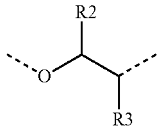

represents an ethylene oxide (EO) unit or a propylene oxide (PO) unit or both.

5. The solvent composition of claim 1, wherein independent from each other a) R4 is hydrogen or a C1 to C2 alkyl group;

b) R5 is hydrogen or a C1 to C2 alkyl group; and c) Z is an integer from 0 to 3.

6. The solvent composition of claim 1, wherein the solvent composition does not comprise N-methyl-2-pyrrolidone.

7. The solvent composition of claim 1, wherein;

a) R is a methyl group, b) R2 is hydrogen, c) R3 is hydrogen, d) X is from 1 to 2.2, e) R4 is a methyl group and R5 is hydrogen, or R4 is hydrogen and R5 is a methyl group, f) R6 is n-butyl, and g) Z is 0.

8. A non-aqueous solvent delivery formulation comprising:

the solvent composition claim 1; and a urease inhibitor dissolved in the solvent composition, wherein the concentration of the urease inhibitor in the non-aqueous solvent delivery formulation is up to 40 wt % based on the total mass of the non-aqueous solvent delivery formulation.

9. The non-aqueous solvent delivery formulation of claim 8, wherein the urease inhibitor comprises or consists of an N-alkyl thiophosphoric triamide.

10. The non-aqueous solvent delivery formulation of claim 8 wherein the concentration of the solvent composition is at least 50 wt. % based on the total mass of the non-aqueous solvent delivery formulation.

11. The non-aqueous solvent delivery formulation of claim 8, wherein the non-aqueous solvent delivery formulation further comprises one or more nitrification inhibitors.

12. The non-aqueous solvent delivery formulation of claim 8, wherein the non-aqueous solvent delivery formulation further comprises one or more pesticide actives.

13. The non-aqueous solvent delivery of formulation claim 8, wherein the non-aqueous solvent delivery formulation further comprises additives.

14. A fertiliser comprising at least a urea-based component and the non-aqueous solvent delivery formulation of claim 8.

15. The fertiliser of claim 14, wherein the fertiliser is a solid fertiliser.

16. A method for obtaining a fertiliser, the method comprising:

providing a urea component; and treating the urea component with the non-aqueous solvent delivery formulation of claim 8 to produce a fertilizer.

17. The solvent composition of claim 1, wherein (A) the alkyl glycol ester-type solvent of the formula (I) and (B) the glycol-type solvent of the formula (II)

together form greater than 90 wt % of the solvent composition.

18. The solvent composition of claim 1, wherein (A) the alkyl glycol ester-type solvent of the formula (I) and (B) the glycol-type solvent of the formula (II)

together form greater than 95 wt % of the solvent composition.

19. The solvent composition of claim 1, wherein the solvent composition exclusively consists of (A) and (B).

20. The non-aqueous solvent delivery formulation of claim 11, wherein said nitrification inhibitors comprise dicyandiamide, nitrapyrin, pronitridine, allylthiourea, 3,4-dimethylpyrazole phosphate, or mixtures thereof.

21. The non-aqueous solvent delivery formulation of claim 12, wherein said pesticide actives comprise herbicides, fungicides, insecticides, or mixtures thereof.

22. The non-aqueous solvent delivery formulation of claim 13, wherein said additives comprise micronutrients, biostimulants, plant growth regulators, or mixtures thereof.

* * * * *